US008014765B2

(12) United States Patent
Pettinato

(10) Patent No.: US 8,014,765 B2
(45) Date of Patent: *Sep. 6, 2011

(54) REAL-TIME CAPTIONING FRAMEWORK FOR MOBILE DEVICES

(75) Inventor: Richard F. Pettinato, Cardiff by the Sea, CA (US)

(73) Assignee: Media Captioning Services, Carlsbad, CA (US)

( * ) Notice: Subject to any disclaimer, the term of this patent is extended or adjusted under 35 U.S.C. 154(b) by 847 days.

This patent is subject to a terminal disclaimer.

(21) Appl. No.: 11/043,229

(22) Filed: Jan. 25, 2005

(65) Prior Publication Data

US 2005/0210516 A1   Sep. 22, 2005

Related U.S. Application Data

(60) Provisional application No. 60/554,896, filed on Mar. 19, 2004.

(51) Int. Cl.
*H04L 29/08* (2006.01)
(52) U.S. Cl. ............... 455/414.4; 455/414.1; 455/414.2; 455/412.1; 704/235
(58) Field of Classification Search .................. 455/403, 455/414.1, 414.4, 3.06, 463, 412.1; 379/88.13; 348/435.1; 704/235
See application file for complete search history.

(56) References Cited

U.S. PATENT DOCUMENTS

| | | | |
|---|---|---|---|
| 5,543,850 A | | 8/1996 | Pratt et al. |
| 6,061,056 A | | 5/2000 | Menard et al. |
| 6,219,537 B1 * | | 4/2001 | James et al. ............... 455/403 |
| 6,513,003 B1 * | | 1/2003 | Angell et al. ............... 704/235 |
| 6,766,163 B1 * | | 7/2004 | Sharma ............... 455/412.1 |
| 6,785,539 B2 * | | 8/2004 | Hale et al. ............... 455/422.1 |
| 6,820,055 B2 | | 11/2004 | Saindon et al. |
| 6,847,778 B1 * | | 1/2005 | Vallone et al. ............... 386/68 |
| 6,892,390 B1 * | | 5/2005 | Lieberman et al. ........... 725/135 |
| 7,131,003 B2 | | 10/2006 | Lord et al. |
| 7,268,823 B2 | | 9/2007 | Mitts et al. |
| 7,421,477 B2 | | 9/2008 | Pettinato |
| 7,844,684 B2 | | 11/2010 | Pettinato |

(Continued)

FOREIGN PATENT DOCUMENTS
WO   2005/094429   10/2005

OTHER PUBLICATIONS

"Town council sets precedent for closed-captioning of meetings," http://www.northpeel.com/br/gi/news/story/3118425p-3617435c.html, 3 pages, (accessed on Dec. 16, 2005).

(Continued)

*Primary Examiner* — Patrick N Edouard
*Assistant Examiner* — Chuck Huynh
(74) *Attorney, Agent, or Firm* — Fish & Richardson P.C.

(57) ABSTRACT

A system for providing caption information for one or more mobile devices includes a communication network, and one or more mobile devices connected to the communication network. The one or more mobile devices can include a cellular device, a personal digital assistant, or a wireless device. The system includes a captioning device to present caption data on a display, and a transcription device to transcribe data. The transcription device provides near real time delivery of the data transcription. The system uses the communication network to send text from the caption data to at least one of the mobile devices, while the system sends the caption data to one or more captioning devices simultaneously.

22 Claims, 6 Drawing Sheets

U.S. PATENT DOCUMENTS

| | | | |
|---|---|---|---|
| 2001/0025241 A1* | 9/2001 | Lange et al. | 704/235 |
| 2003/0035063 A1* | 2/2003 | Orr | 348/465 |
| 2003/0149574 A1 | 8/2003 | Rudman | |
| 2004/0006481 A1* | 1/2004 | Kiecza et al. | 704/276 |
| 2004/0103372 A1* | 5/2004 | Graham | 715/513 |
| 2004/0171371 A1* | 9/2004 | Paul | 455/414.4 |
| 2005/0108026 A1* | 5/2005 | Brierre et al. | 705/1 |
| 2005/0177861 A1 | 8/2005 | Ma et al. | |
| 2005/0210511 A1 | 9/2005 | Pettinato | |
| 2005/0227614 A1* | 10/2005 | Hosking et al. | 455/3.06 |
| 2008/0293443 A1 | 11/2008 | Pettinato | |
| 2008/0294434 A1 | 11/2008 | Pettinato | |

OTHER PUBLICATIONS

"Wireless Audio Captions Now Possible," http://abclocal.go.com/kgo/story?section=edell&id=3587915, 9 pages, (accessed on Dec. 16, 2005).

Gary D. Robson, "Closed-Captioned Radio", Newswaves Feb. 1997, http://robson.org/gary/writing/nw-capradio.html.

"Closed Captioning—Captioning Overview FAQ", http://robson.org/capfaq/overview.html.

Ken Kershbaumer, "WRAL Goes Cellular" Broadcsting&Cable, Dec. 20, 2004.

Notice of Allowance issued in U.S. Appl. No. 12/191,265, on Aug. 4, 2010 (29 pages).

EEG iCap CaptionCast, downloaded from the internet on Sep. 30, 2010 at http://www.eegent.com/software/icap-captioncast, 5 pages.

Smart Accessibility Solutions, downloaded from the internet on Sep. 30, 2010 at http://streamtext.net, 3 pages.

iCap Real-Time IP Caption Link, User Manual v 2.0, EEG Enterprises, Inc., Farmingdale, NY, 2008, 17 pages.

Consumer Electronics Association; "Digital Television (DTV) Closed Captioning- CEA-708-D"; Aug. 2008; Arlington, Virginia, 118 pages.

Consumer Electronics Association; "Line 21 Data Services—ANSI/CEA-608-E"; Apr. 2008; Arlington, Virginia, 144 pages.

Office Action issued in U.S. Appl. No. 11/087,023, on Feb. 6, 2008, 25 pages.

International Search Report and Written Opinion issued in PCT/US05/07188 on Nov. 16, 2005, 10 pages.

International Preliminary Report on Patentability issued in PCT/US05/07188 on Feb. 24, 2009, 5 pages.

* cited by examiner

REAL-TIME CAPTIONING FRAMEWORK FOR MOBILE DEVICES

CROSS REFERENCE TO RELATED APPLICATIONS

This application claims the benefit of priority from U.S. Provisional Application entitled "A Real-Time Captioning Framework for Mobile Devices", Application No. 60/554,896 filed Mar. 19, 2004 by Richard F. Pettinato et al., the disclosure of which is incorporated by reference.

TECHNICAL FIELD

The present disclosure relates to media content, in particular media content that is captioned for mobile applications and devices.

BACKGROUND

Traditional captioning devices, such as televisions and display monitors, combine text with a video broadcast, in which the text represents a transcribed audio portion of the video. The captions can be either closed captions or open captions. For closed captions, the caption data is embedded in a video signal, and the captions are not displayed unless they are decoded. The text or caption data is embedded in line 21 of the vertical blanking interval (VBI). The VBI is an interval in a television signal that temporarily suspends transmission of the signal for an electron gun to move to the first line of a television screen for the next screen field. The VBI can be used to carry data, such as a test signal or the closed-captioning data. When captions are decoded, they are displayed on the screen. Typically, captions are decoded at the display device. Open captions are already decoded in the video signal and are displayed on screen, such as subtitles in foreign films. In broadcast transmission systems, caption data may be transmitted to an encoder that may include text and control codes.

Caption data may also be provided to the internet using transcribed data from broadcast sources, such as broadcast radio or television signals. For instance, a caption writer for a radio station may transcribe a broadcast program from the radio station to post on the radio station's web page. In another example, a caption writer may caption the audio portion of a television signal and send the caption data to an encoder device at a broadcast facility for inclusion in the video transmission.

SUMMARY

The present disclosure describes methods, systems, and techniques for captioned media content.

In one general aspect, the techniques feature a system for providing near real time caption information for one or more mobile devices. The system includes a communication network for communicating to the mobile devices, and a transcriber connected with the communication network. The transcriber is configured to transcribing an event to generate caption data, in which the caption data includes transcribed data and control code data. The system is further configured for near real time transfer of the transcribed data over the communication network to the one or more mobile devices.

Advantageous implementations can include one or more of the following features. The system can be configured to transfer transcribed data to at least two mobile devices simultaneously. The communication network can include the Internet, and at least one of the mobile devices includes a display to present the transcribed data.

The system can also have a device with captioning functionality and a display to present caption data. The system may have a decoder to decode the caption data for presentation on the device with captioning functionality. The system can be configured for near real time transfer of the caption data to the decoder. A data file may be used in saving and retrieving the transcribed data sent to the mobile device.

In another general aspect, the techniques feature a method for sending near real time caption information to one or more mobile devices. The method involves transcribing an event to generate device-generated caption data having control codes, removing the control codes from the caption data to produce text data, and sending the text data to one or more mobile devices over a communication network.

Advantageous implementations can include one or more of the following features. The method may involve sending the caption data to a captioning device while near-simultaneously sending the text data to one or more mobile devices. The communication network may include, but is not limited to, any of the following: a satellite channel; a telephony channel; an optical channel; a wireless channel; a cable channel; and an internet channel.

The caption data can include voice data that is transcribed into the text data. The transcribing can involve using a transcription device to add control codes to the transcribed data. The method may include using the control codes to encapsulate the transcribed data, and sending the encapsulated data to a caption target. The caption target may include a monitor or a television with closed-captioning functionality.

The operation of removing control codes from the transcribed data may include using software to remove the control codes. The operation of transcribing data may involve using voice-recognition software that transcribes voice data into the text-based caption data. The method may also include displaying the text data on one or more mobile devices.

In another general aspect, the techniques feature an article that includes a machine-readable medium storing instructions operable to cause a machine to perform operations. The operations involve generating transcribed data from a transcription device, sending text data from the transcribed data to a mobile device using a communication network, and sending the transcribed data from the transcription device to a caption target. The text data is sent to the mobile device and the transcribed data is sent to the caption target simultaneously. The text data is sent to the mobile device and the transcribed data is sent to the caption target in near real time.

Advantageous implementations can include one or more of the following features. The transcribed data may include control code data for the caption target, in which the caption target may have closed-captioning functionality. The operations may also include removing the control code data from the transcribed data before sending the text data to the mobile device. The operation of sending text data from the transcribed data to the mobile device may involve sending the transcribed data with removed control code data to the mobile device.

The operation of removing the control code data from the transcribed data may use software that is configured to remove the control code data. The communication network may use a server. The server may be implemented in hardware or software.

In another general aspect, the techniques feature an article that includes a machine-readable medium storing instructions operable to cause a machine to perform operations. The operations involve transcribing audio data from a radio broadcast, and sending the transcribed audio data to at least one mobile device using a communication network. The operation of sending the data involves near real-time transmission of the transcribed audio data. The communication network is coupled to at least one mobile device.

Advantageous implementations can include one or more of the following features. The operations may also involve saving the transcribed audio data to a file, in which the file is configured to be downloaded onto at least one mobile device. A transcription device may be used in the operation of transcribing the audio data. The operations may also include using a software program to remove closed-captioning control codes from the transcribed audio data prior to sending the transcribed audio data to at least one mobile device. The transcribed audio data may involve audio data that is transcribed into text data. The audio data may be voice data.

In one exemplary implementation, a system includes a communication network, such as the Internet, and one or more mobile devices coupled to the communication network. The system includes a transcription device to transcribe data in real time or near real time (real time with a small time delay). The transcribed data includes text data and control code data. The control code data is used by one or more captioning devices to display caption data. The control code data is removed from transcribed data, and the mobile devices receive text data via the communication network. The system can simultaneously send transcribed data to one or more captioning devices, while sending the text data to one or more mobile devices.

Details of one or more implementations are set forth in the accompanying drawings and the description below. Other features and advantages will be apparent from the description and drawings, and from the claims.

DRAWING DESCRIPTIONS

Like reference symbols in the various drawings indicate like elements.

DETAILED DESCRIPTION

The following detailed description makes reference to the accompanying drawings. Other embodiments of the present invention are possible and modifications may be made to the embodiments without departing from the spirit and scope of the invention. Therefore, the following detailed description is not meant to limit the invention.

Moreover, for convenience in the ensuing description, some explanations of terms are provided herein. However, the explanations contained herein are intended to be exemplary only. They are not intended to limit the terms as they are described or referred to throughout the specification. Rather these explanations are meant to include any additional aspects and/or examples of the terms as described and claimed herein and/or as used by one of skill in the art.

The following describes various tasks, techniques, and systems relating to closed-captioning for media content. The present disclosure describes methods and systems that involve a framework for sending real-time caption data from a caption writer to one or more mobile devices through a communication network, such as the internet, while simultaneously having the ability to send caption data to traditional captioning devices, such as a television or monitor that can display captioned information.

The caption writer refers to a person, such as a stenographer, who transcribes data from a source presentation or an event. The data may be from a "live" event, such as a sporting event, an academic presentation, or a financial news report. The data can be audio and/or video data that is transcribed into text data. The caption writer may also transcribe the data remotely, in which the writer does not have to be physically present to perform the transcription. The writer may remotely listen to and/or watch the event using a telephone and/or a monitor or television set. The event may or may not be an event that is broadcasted, such as an event using broadcast television or radio signals.

Figure 1:
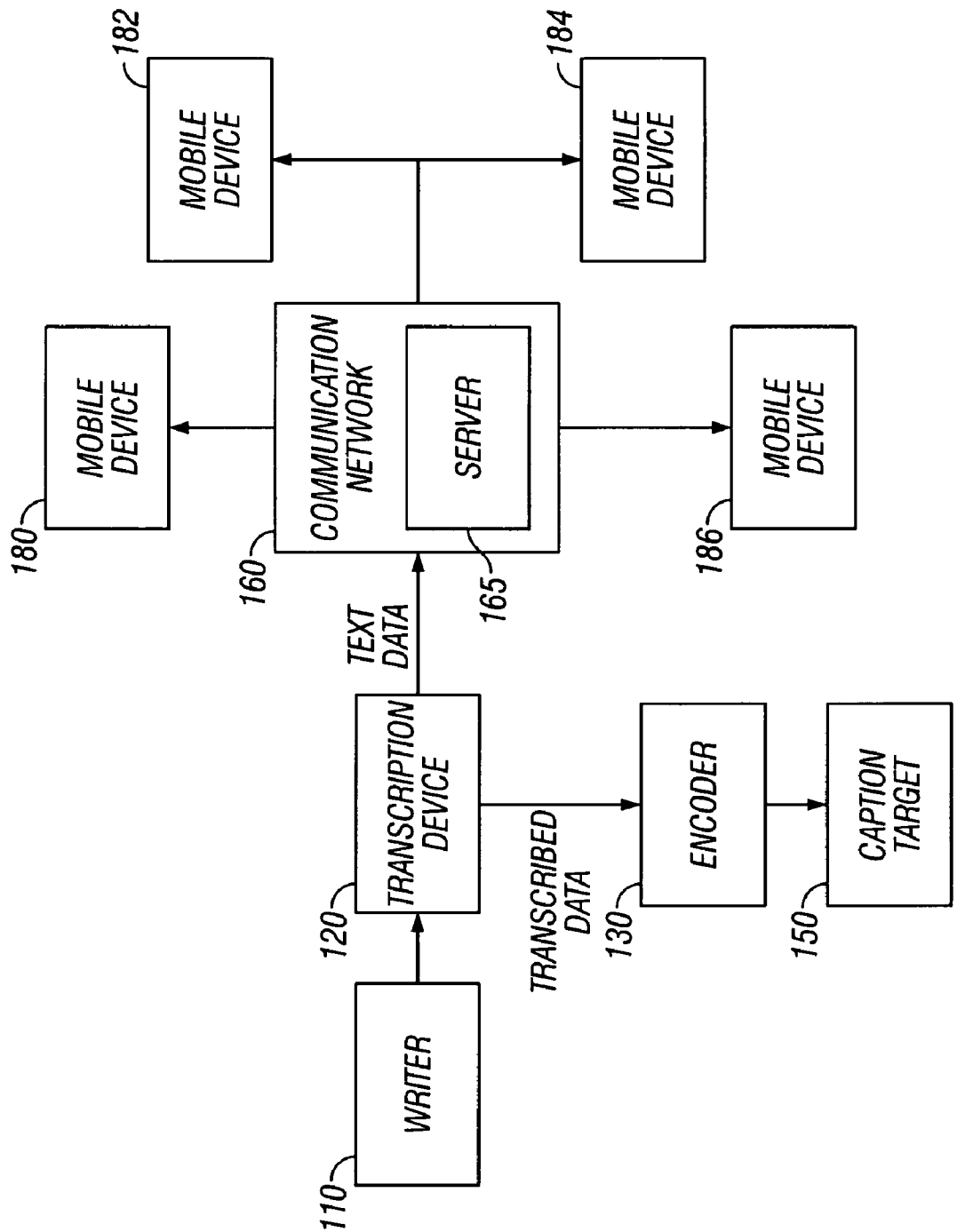
FIG. 1 shows an exemplary block diagram of the captioning system.

As shown in FIG. 1, the captioning system can simultaneously send caption information to traditional captioning devices/targets 150 and mobile devices 180, 182, 184, 186. The captioning targets 150 receive transcribed data, which includes text data entered by the writer 110 and control code data for the captioning device 120. The mobile devices 180, 182, 184, 186 are connected to a communication network 160 and receive text data, and not the control code data. Typically, the control code data is removed from the transcribed data prior to sending data to the communication network 160.

FIG. 1 shows a block diagram of a captioning system, in which one or more users receive real-time closed-caption data on one on more mobile devices. The caption writer 110 listens to and/or watches an event, and transcribes that event into text data using a transcription device 120. The transcription device 120 may include a transcription-type device or a stenographic-type device. The transcription device 120 includes software and/or hardware to aid in the captioning process, and may have software to add control code data to the transcribed data in a captioning process. The control code data are used in traditional captioning devices for displaying captioned text on a monitor. The transcription device 120 may have software and a keyboard to enable the caption writer 110 to transcribe at rates of up to hundreds of words per minute. For example, the device 120 may have a stenographic keyboard and may include a computer having voice recognition software.

The transcribed data from the writer is sent to the transcription device 120 that sends the transcribed data to an encoder 130. The encoder 130 uses the control codes to encapsulate the transcribed data for presentation on a caption target 150. The caption target 150 can refer to a monitor or a television with closed-captioning functionality.

Instead of or in addition to sending transcribed data to an encoder, the transcription device 120 may remove the control code data from the transcribed data and send text data to a communication network 160 to enable for one or more users to access the text data. Examples of communication networks include various forms or mediums of data communications, such as a local area network ("LAN"), a wide area network ("WAN"), a wireless local area network ("WLAN"), and a personal area network ("PAN"). Other examples of communication networks include a mobile communication network using a multiple access technology, such as a cellular phone network with Code Division Multiple Access, ("CDMA"), a satellite network, and the Internet.

In sending the text data to the communication network 160, the transcription device 120 may have software to remove the control codes from the transcribed data before sending the data to the communication network 160. In removing the control codes, the data that is transmitted to components includes text data. The text data can be sent to the communication network 160 and can be displayed on one or more mobile devices 180, 182, 184, 186, such as computers, cell phones, and personal digital assistants (PDAs). The communication network 160 interacts with a server 165 to communicate with multiple devices. The server 165 may refer to one or more hardware servers, or software servers, such as a server program. The text data may be displayed as scrolling text data, in which the text is updated as the mobile device 180 receives text. The devices may be internet-compatible devices and may be connected through a cellular phone network. As used herein, a mobile device may also refer to any general-purpose mobile machine that processes data according to a set of instructions that is stored internally either temporarily or permanently, including, but not limited to, general-purpose mobile computers, laptop computers, internet-compatible mobile phones, wired or wireless laptop computers. Mobile devices also include satellite-based transmission devices, smart client devices (that actively fetch data and store data locally), wireless devices, a cellular or mobile telephone, an electronic handheld unit for the wireless receipt and/or transmission of data, a media content playable device, such as an MP3 player, or the like. Each device may have a specific or unique internet address, in which the communication network may direct data to one or more devices based on the device's internet address.

To provide for interaction with a user, each of the mobile devices 180, 182, 184, 186 uses a display, such as a cathode ray tube (CRT) or liquid crystal display (LCD) monitor, which displays information to the user and a keyboard and/or a pointing device, such as a mouse or a trackball, to serve as input to the mobile device. The mobile device may provide feedback to the user with any form of sensory feedback, such as visual feedback or tactile feedback.

The communication network 160 may include a back end component, such as a data server, or a middleware component, such as an application server, or a front end component, such as a client computer having a graphical user interface, portal, or a Web browser through which a user can interact with an implementation of the systems and techniques described here. The mobile device 180 itself may have a front end component that includes a graphical user interface. In general, the communication network 160 and/or the mobile device 180 may use any combination of such back end, middleware, or front end components.

The software (also known as programs, software tools or code) in the captioning system of FIG. 1 may include machine instructions for a programmable processor, and can be implemented in a high-level procedural and/or object-oriented programming language, and/or in assembly/machine language. The mobile device 180 may have an Application Programming Interface (API). For example, the mobile device 180 may also run on a Binary Runtime Environment for Wireless (BREW) platform, an open-source on-line application development platform for wireless CDMA devices from Qualcomm, Inc. of San Diego, Calif. The BREW platform can allow application developers to write programs and scripts in various software languages, such as C, C++, JAVA, and XML. The mobile device 180 may have a software media player, such as a Windows media player, that can show the text data and/or a video presentation of the transcribed event.

As used herein, the term "machine-readable medium" refers to any computer program product, apparatus and/or device used to provide machine instructions and/or data to a programmable processor, including a machine-readable medium that receives machine instructions as a machine-readable signal. The machine-readable medium refers to magnetic discs, optical disks, memory, Programmable Logic Devices (PLDs), and the like. The term "machine-readable signal" refers to any signal used to provide machine instructions and/or data to a programmable processor.

In the described system, the caption writer 110 can be located remotely from the source of the transcribed event. Also, the data can be sent to a mobile device using the communication network 160, such as the internet. Internet-compatible devices with displays can present captioned text in real time or near real time. The transcribed data can be presented on a traditional caption target 150 and a mobile device 186 simultaneously.

The captioning system can send the data to multiple devices, as well as sending the data to multiple devices simultaneously. Moreover, the writer 110 can transcribe the information of the event, and the transcription device 120 can send the data to one or more targets and/or devices in real time or near real time. In one implementation, a device can allow a user to save and retrieve any part of a captioned message on their device. Alternatively, a user can download a saved text captioned message from a web site for subsequent viewing. For example, if a user wants to read what happened in the last two minutes of a basketball game, the user can log on to a website to access all or only a selected portion of the captioned play-by-play information.

Figure 2A:
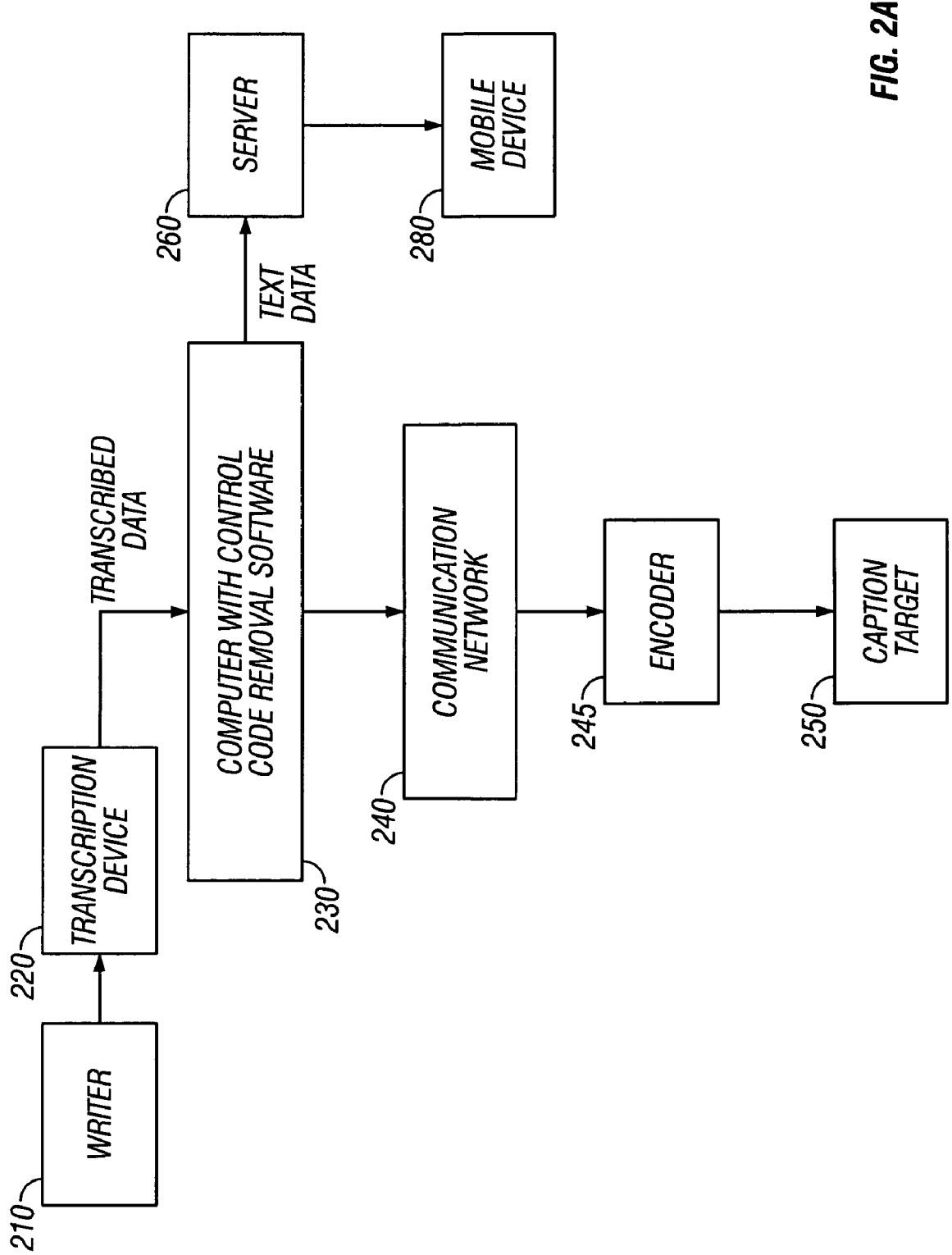
FIGS. 2A-2B is an exemplary block diagram of the captioning system.

FIG. 2A shows another implementation of a mobile captioning system. The captioning system can simultaneously send caption information to traditional captioning devices/targets 250 and a mobile device 280. In FIG. 2A, the mobile captioning system can strip out the control code data in the transcribed data in the device 220 to have plain ASCII text (American Standard Code for Information Interchange) to be sent to the mobile device 280. Instead of or in addition to sending the data to the mobile device, the mobile captioning system can send the transcribed data with the control code data from the device 220 to an encoder 245 to provide close captioning at a caption target 250, such as a television or monitor. This can be performed using remote caption writing, and may be accomplished simultaneously and/or in real time or near real time.

In FIG. 2A, a writer 210 transcribes the event data that they hear or see into a device 220 that sends the data to a computer 230. The transcription device 220 includes a computer with software to add control code data to the text produced from the writer 210. The event data may or may not be broadcasted over conventional television or radio channels. The data is sent from the computer 230 to a communication network 240 and then to an encoder 245. As described above, the communication network 240 may include a modem, an internet channel, and/or a telephony channel. The encoder 245 encaptions the data at the caption target 250 so that the data is put into a format for presentation on a television or a monitor, such as utilizing line 21 of the VBI as described above. The caption target 250 itself has a decoder to decode the encaptioned data from the encoder 245 prior to presenting the text on the monitor.

Alternatively and/or simultaneously, software in the computer 230 removes the control codes from the transcribed data and sends text data to a server 260. The server 260 may be implemented in hardware or software. The server 260 sends the text data to the mobile device 280. In one implementation, the server may send the text data to the mobile device using a communication network, such as the internet. The mobile device 280 can receive the data from the communication network through a router, such as a cable, DSL (Digital Subscriber Line) router, or a router in an enterprise or business environment.

The server 260 can send the text data to the mobile device 280 via an internet address. In one implementation, the mobile device 280 has a particular internet address. As the text data is routed through the internet, the text data is routed to the internet address of a particular mobile device 280. In this aspect, the mobile device 280 is a client to the server 260.

Instead of being located in the computer 230, the software or program to remove the control code data from the transcribed data can be distributed among one or more components of FIG. 2A. In one implementation, the control code data may be removed by software located in the device 220 itself, as described in FIG. 1. The transcribed data may then be sent to the caption target 250 and/or the text data may be sent to the mobile device 280 without using the computer 230.

In another implementation, both the caption target 250 and the mobile device 280 can receive the transcribed data with the control code data. The mobile device 280 itself may have software to remove the control code data. The device 280 can have captioning abilities without having to require control-code-removing software in another component of the system.

Figure 2B:
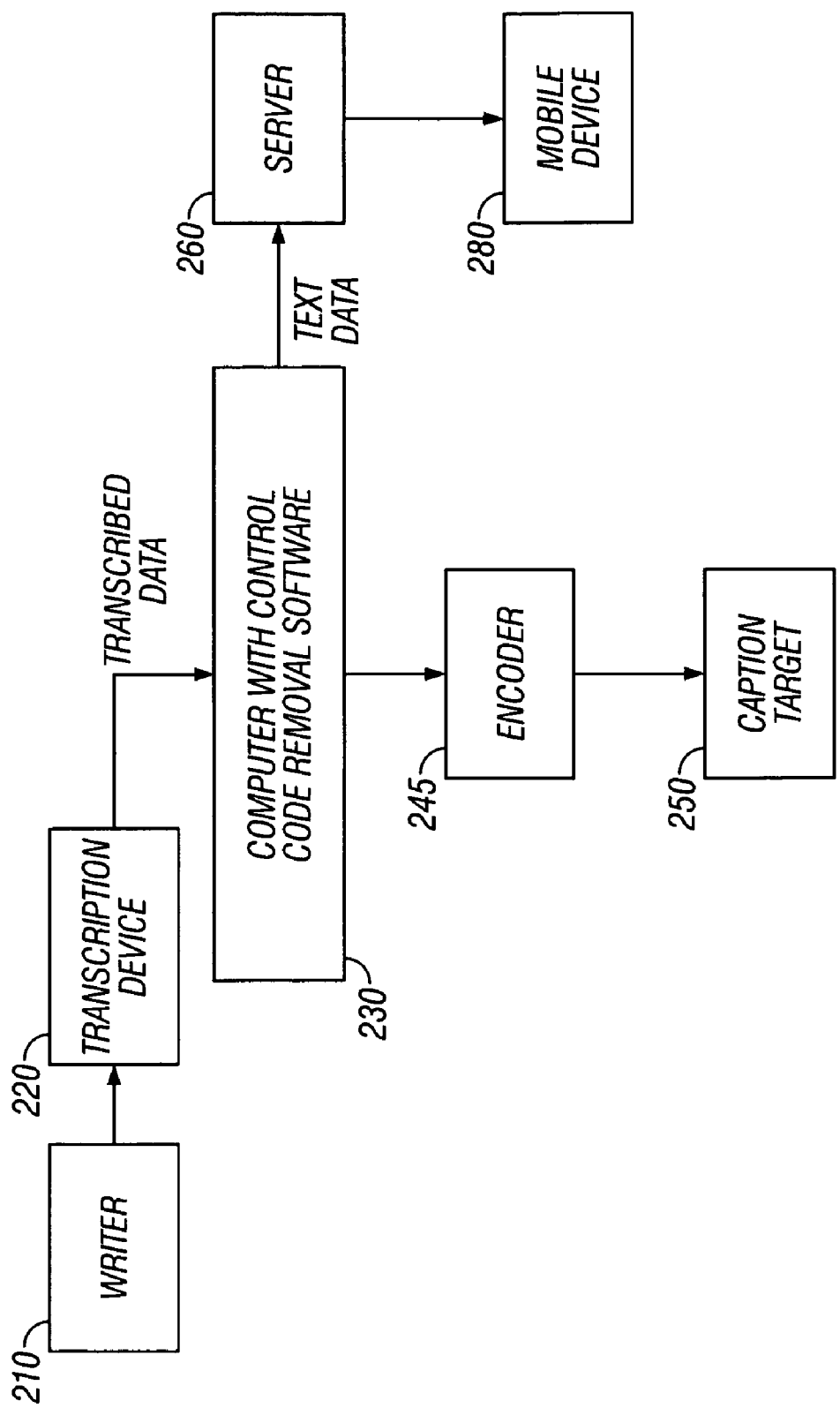

FIG. 2B shows another implementation of the captioning system described with respect to FIG. 2A. In FIG. 2B, the data is sent from the computer 230 to the encoder 245 to encaption the data at the caption target 250. Text data is sent from the computer to the server 260. The server 260 interacts with a mobile device 280 to present the text data on the mobile device 280.

Figure 3:
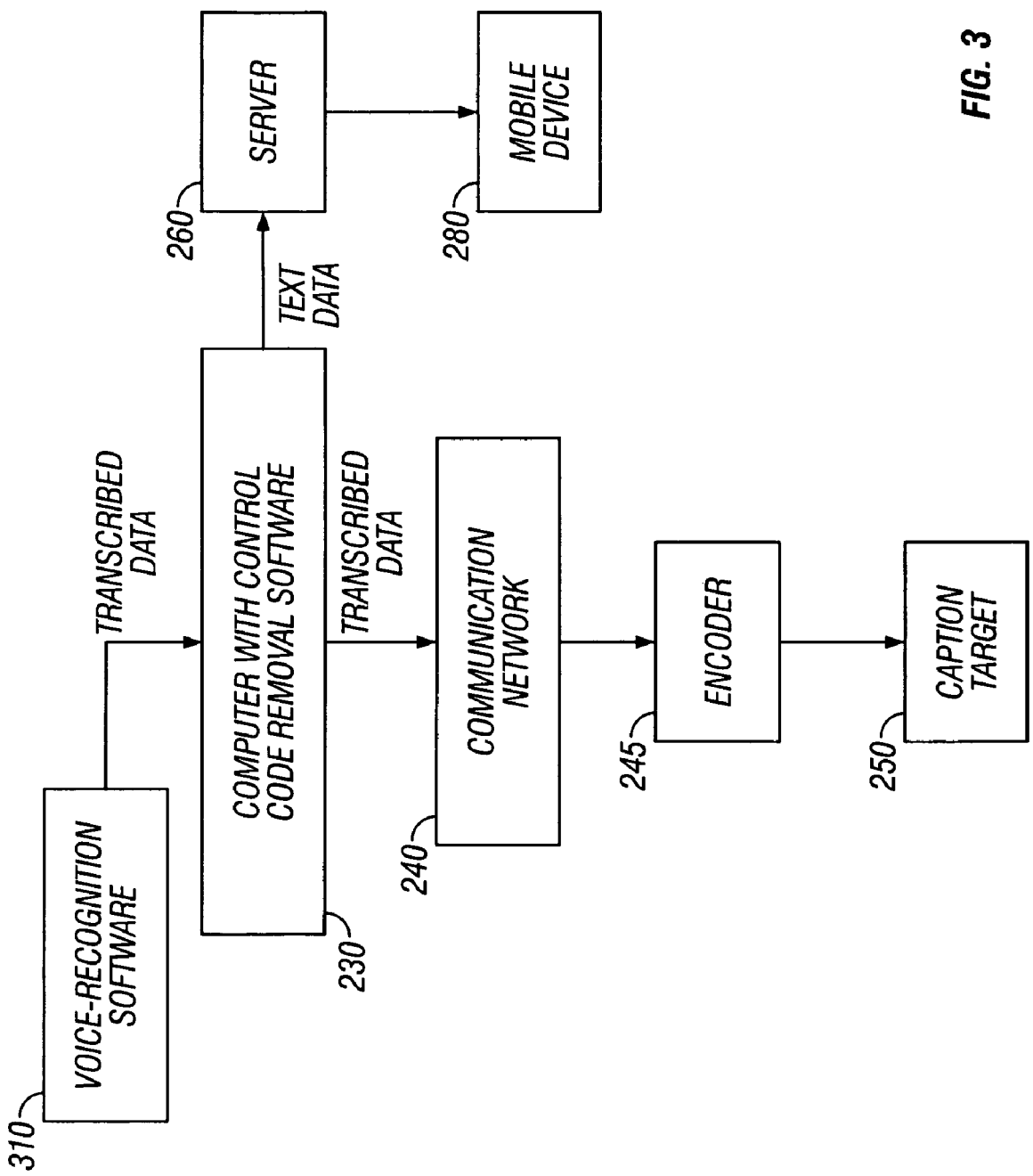
FIG. 3 is an exemplary block diagram of the captioning system with voice-recognition software.

In an alternative implementation shown in FIG. 3, voice-recognition software can be used to generate caption information. Voice-recognition software 310 can be used instead of the writer 210 and the transcription device 220. The voice recognition software can convert speech/audio input into transcribed data output. The transcribed data can include control codes to be sent to the caption target 250. At the same time, the voice-recognition software can output the text of the transcribed data to be sent to the mobile device 280.

Figure 4A:
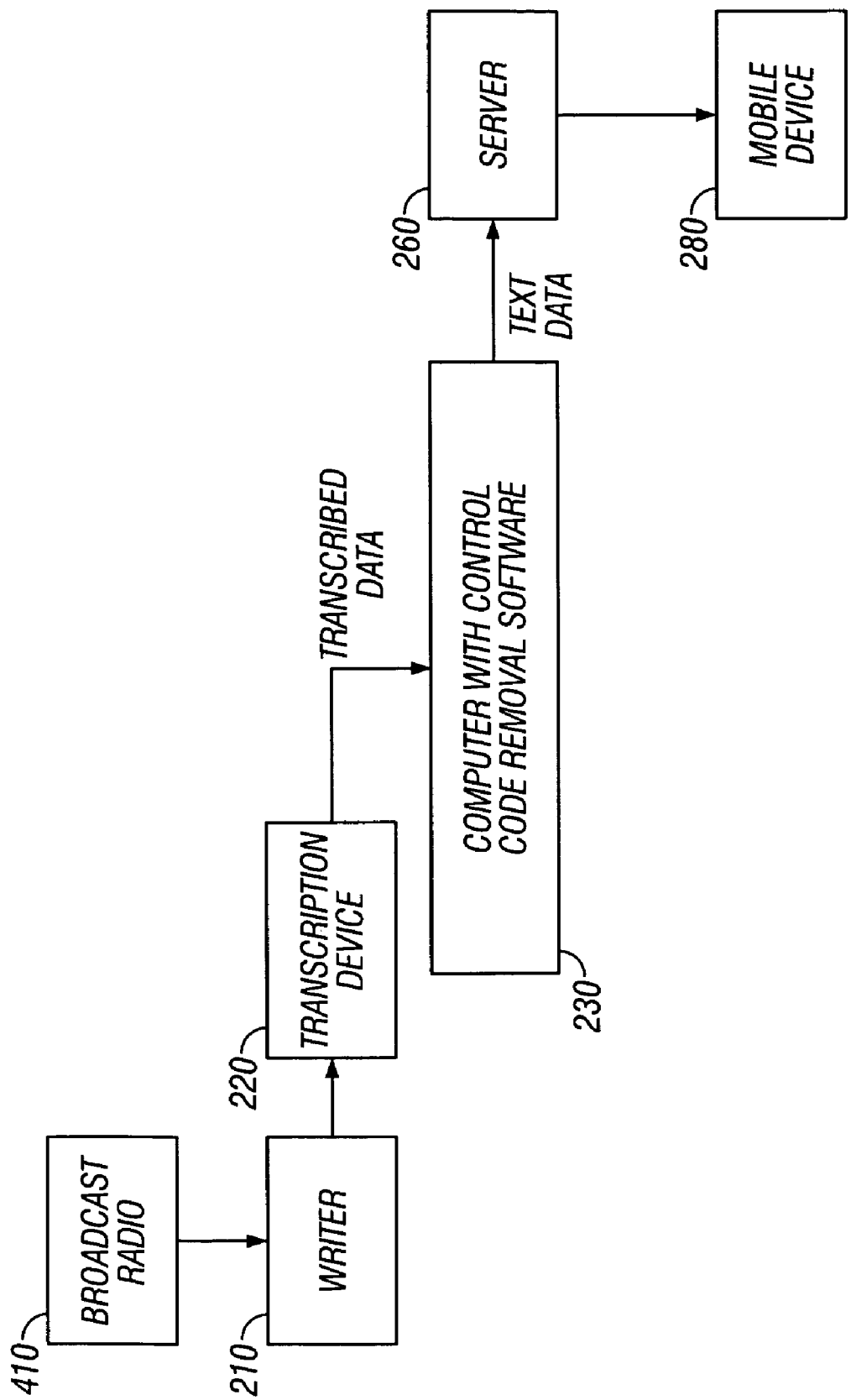
FIGS. 4A-4B show exemplary block diagrams of the captioning system with broadcast radio.

FIG. 4A shows an implementation of the captioning system in which broadcast radio 410 is used as a source of information for the caption writer 210. In this implementation, a caption writer 210 listens to a radio broadcast and transcribes the broadcast information into text data using the transcription device 220. As described with respect to FIG. 2, the mobile captioning system can strip out the control code data in the transcribed data in the device 220, or software in the computer 230 can remove the control codes from the transcribed data before sending the text data to the server 260. The server 260 sends the text data to the mobile device 280.

Figure 4B:
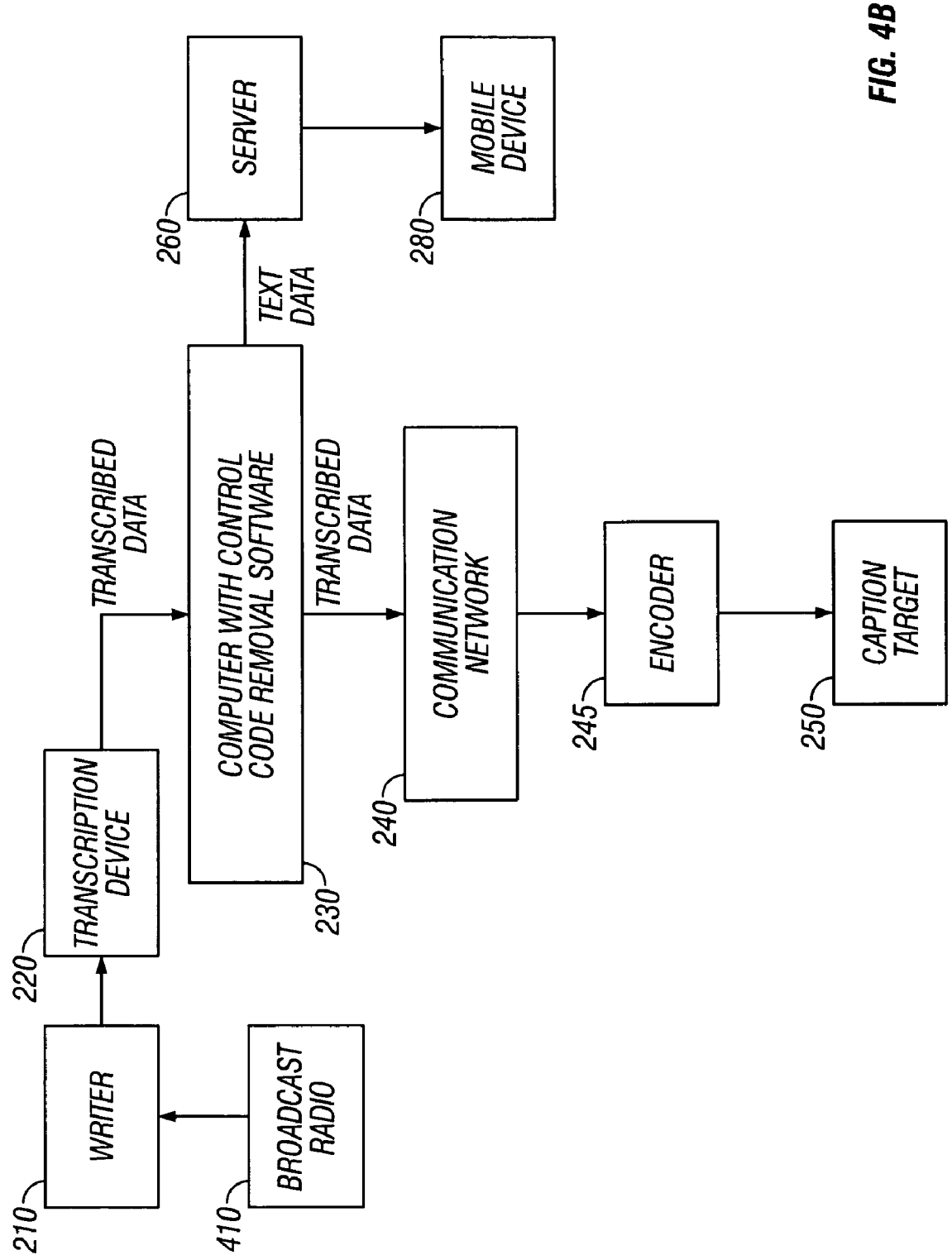

FIG. 4B shows another implementation of the captioning system shown in FIG. 2A with a radio broadcast 410 information source for the caption writer 210. The captioning system can simultaneously send caption information to traditional captioning devices/targets 250 and a mobile device 280. The mobile captioning system can strip out the control code data in the transcribed data in the device 220 to have text data (to be sent to the mobile device 280. Instead of or in addition to sending the data to the mobile device, the mobile captioning system can send the transcribed data with the control code data from the device 220 to an encoder 245 to provide close captioning at a caption target 250, such as a television or monitor. This operation can be performed using remote caption writing, and may be accomplished simultaneously and/or in real time or near real time. The transcription of the radio broadcast 410 provides transcribed data from a real time audio source.

Other implementations may be within the scope of the following claims.

What is claimed is:

1. A system for providing real time caption information for one or more mobile devices, the system comprising:
    a server for communicating to the one or more mobile devices;
    a stenocaptioning device configured for transcribing audio from an audio event simultaneously with an occurrence of the audio event, the stenocaptioning device further configured to generate caption data that comprises transcribed data and control code data;
    a captioning device to receive the caption data; and
    a software tool configured to remove the control code data from the caption data to generate text data,
    wherein the system is configured for transfer of the text data over the server to the one or more mobile devices and transfer of caption data to the captioning device,
    wherein the system is configured for transfers of the text data and caption data that occur coincidentally with the transcribing of audio from the audio event, and
    wherein the system is further configured for simultaneous transfer of the text data to the one or more mobile devices and the caption data to the captioning device.

2. The system in accordance with claim 1, wherein the system is configured to transfer text data to at least two mobile devices simultaneously.

3. The system in accordance with claim 1, further comprising an encoder to receive the caption data prior to the caption data reaching the captioning device.

4. The system in accordance with claim 3, wherein the encoder is configured to encapsulate the caption data.

5. The system in accordance with claim 1, wherein the control codes are removed from a line 21 of a vertical blanking interval (VBI) in a video signal.

6. The system in accordance with claim 5, further comprising a decoder to decode the caption data for presentation on the captioning device.

7. A method for sending caption information to one or more mobile devices, the method comprising:
    transcribing audio to generate device-generated caption data having control codes, the transcribing audio comprises transcribing audio from an audio event simultaneously with an occurrence of the audio event;
    removing the control codes from the caption data to produce unencoded text data by removing control codes from a line 21 of a vertical blanking interval (VBI) of a video signal;
    sending the unencoded text data to one or more mobile devices over a communication network, the sending the unencoded text data comprises sending the unencoded text data to one or more mobile devices coincidentally with the transcribing audio from the audio event; and
    sending the caption data to a captioning device, the sending the caption data comprises:
        sending the unencoded text data to the one or more mobile devices simultaneously with the sending of the caption data to the captioning device; and
        sending the caption data to the captioning device coincidentally with the transcribing audio from the audio event.

8. The method in accordance with claim 7, wherein the communication network comprises any one of a satellite channel, a telephony channel, an optical channel, a wireless channel, a cable channel, and an internet channel.

9. The method in accordance with claim 7, wherein the caption data comprises voice data transcribed into encoded text data.

10. The method in accordance with claim 7, wherein the transcribing comprises using a transcription device to add control codes to the device-generated caption data.

11. The method in accordance with claim 7, further comprising using the control codes to encapsulate the caption data.

12. The method in accordance with claim 11, sending the encapsulated data to the captioning device.

13. The method in accordance with claim 12, wherein the captioning device comprises a monitor or a television comprising closed-captioning functionality.

14. The method in accordance with claim 7, wherein removing control codes from the caption data comprises using software to remove the control codes.

15. The method in accordance with claim 7, wherein the transcribing data comprises a computer program.

16. The method in accordance with claim 7, further comprising displaying the unencoded text data on one or more mobile devices.

17. The method in accordance with claim 7, wherein the audio comprises incoming audio from a radio broadcast.

18. The method in accordance with claim 7, wherein the audio comprises broadcast audio.

19. The method in accordance with claim 7, wherein the sending the caption data to the captioning device comprises sending the captioning data to an encoder prior to sending the captioning data to the captioning device.

20. The method in accordance with claim 7, wherein the communication network comprises a server.

21. A method for sending caption information to one or more mobile devices and a caption monitor, the method comprising:
   transcribing audio from a radio broadcast to generate device-generated caption data having control codes, the transcribing audio comprises transcribing audio from an audio event simultaneously with an occurrence of the audio event;
   removing the control codes from the caption data to produce unencoded text data;
   sending the unencoded text data to one or more mobile devices via a server, the sending the unencoded text data comprises sending the unencoded text data to one or more Internet-compatible mobile devices coincidentally with the transcribing audio from the audio event; and
   sending the caption data to a captioning monitor, the sending the caption data comprises:
     sending the caption data to an encoder;
     sending the caption data from the encoder to the captioning monitor;
     sending the unencoded text data to the one or more Internet-compatible mobile devices simultaneously with the sending of the caption data to the captioning monitor; and
     sending the caption data to the captioning monitor coincidentally with the transcribing audio from the audio event.

22. The method in accordance with claim 21, wherein the transcribing audio comprises transcribing with a transcription-type device or a stenographic-type device.

* * * * *

UNITED STATES PATENT AND TRADEMARK OFFICE
CERTIFICATE OF CORRECTION

| | | |
|---|---|---|
| PATENT NO. | : 8,014,765 B2 | Page 1 of 1 |
| APPLICATION NO. | : 11/043229 | |
| DATED | : September 6, 2011 | |
| INVENTOR(S) | : Richard F. Pettinato | |

It is certified that error appears in the above-identified patent and that said Letters Patent is hereby corrected as shown below:

In claim 1, column 8, line 5, after "providing" delete "real time".

Signed and Sealed this
Twenty-second Day of November, 2011

David J. Kappos
*Director of the United States Patent and Trademark Office*